US012146294B2

(12) United States Patent
Sahlman et al.

(10) Patent No.: US 12,146,294 B2
(45) Date of Patent: Nov. 19, 2024

(54) METHOD OF CONTROLLING A HYDRAULIC ACTUATOR, A HYDRAULIC ACTUATOR, A HYDRAULIC SYSTEM AND A WORKING MACHINE

(71) Applicants: VOLVO CONSTRUCTION EQUIPMENT AB, Eskilstuna (SE); NORRHYDRO OY, Rovaniemi (FI)

(72) Inventors: Mika Sahlman, Tampere (FI); Kim Heybroek, Kvicksund (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 244 days.

(21) Appl. No.: 17/638,849

(22) PCT Filed: Aug. 30, 2019

(86) PCT No.: PCT/EP2019/073256
§ 371 (c)(1),
(2) Date: Feb. 27, 2022

(87) PCT Pub. No.: WO2021/037382
PCT Pub. Date: Mar. 4, 2021

(65) Prior Publication Data
US 2022/0298751 A1 Sep. 22, 2022

(51) Int. Cl.
*E02F 9/22* (2006.01)
*F15B 11/036* (2006.01)
*F15B 21/08* (2006.01)

(52) U.S. Cl.
CPC .......... *E02F 9/2203* (2013.01); *E02F 9/2267* (2013.01); *E02F 9/2292* (2013.01);
(Continued)

(58) Field of Classification Search
CPC ..... E02F 9/2203; E02F 9/2267; E02F 9/2292; E02F 9/2296; F15B 11/036; F15B 21/087;
(Continued)

(56) References Cited

U.S. PATENT DOCUMENTS

| | | | | |
|---|---|---|---|---|
| 9,021,798 B2 * | 5/2015 | Sipola | F15B 21/14 60/428 |
| 10,352,338 B2 * | 7/2019 | Hahn | F15B 11/10 |

(Continued)

FOREIGN PATENT DOCUMENTS

| | | |
|---|---|---|
| EP | 2546530 A2 | 1/2013 |
| JP | 2002206507 A | 7/2002 |
| KR | 20110084511 A | 7/2011 |

OTHER PUBLICATIONS

Office Action for Korean Patent Application No. 10-2022-7006151, mailed Aug. 23, 2023, 9 pages.

(Continued)

*Primary Examiner* — Richard M Camby
(74) *Attorney, Agent, or Firm* — Sage Patent Group

(57) ABSTRACT

A method of controlling a hydraulic actuator, wherein the hydraulic actuator includes a linear double-acting output member, and at least three working chambers in fluid connection with the output member, the working chambers having respective effective areas with a non-binary relationship; wherein the method includes selectively fluidly connecting each working chamber to either a high-pressure side or a low-pressure side to provide a plurality of discrete pressurization states of the hydraulic actuator; determining at least one of the pressurization states as a prevented pressurization state; and transitioning between a plurality of allowed pressurization states among the pressurization states while preventing transition to the at least one prevented (Continued)

pressurization state. A hydraulic actuator and a hydraulic system are also provided.

15 Claims, 5 Drawing Sheets

(52) U.S. Cl.
CPC .......... *E02F 9/2296* (2013.01); *F15B 11/036* (2013.01); *F15B 21/087* (2013.01); *F15B 2211/7055* (2013.01); *F15B 2211/76* (2013.01)

(58) Field of Classification Search
CPC .......... F15B 2211/7055; F15B 2211/76; F15B 1/024; F15B 1/265; F15B 11/0426; F15B 15/1466; F15B 2211/20538; F15B 2211/20546; F15B 2211/20561; F15B 2211/20569; F15B 2211/20576; F15B 2211/20592; F15B 2211/212; F15B 2211/30565; F15B 2211/30575; F15B 2211/3144; F15B 2211/327; F15B 2211/40592; F15B 2211/613; F15B 2211/62; F15B 2211/625; F15B 2211/6653; F15B 2211/7135; F15B 2211/88
See application file for complete search history.

(56) References Cited

U.S. PATENT DOCUMENTS

| | | | | |
|---|---|---|---|---|
| 10,704,569 | B2 * | 7/2020 | Sipola | F15B 11/006 |
| 11,746,801 | B2 * | 9/2023 | Sahlman | F15B 1/265 60/477 |
| 2007/0120662 | A1 * | 5/2007 | Bishop | F15B 21/087 340/500 |
| 2013/0061946 | A1 | 3/2013 | Bishop | |
| 2015/0298730 | A1 | 10/2015 | Wiktor et al. | |
| 2016/0375975 | A1 | 12/2016 | Fell | |
| 2018/0306211 | A1 | 10/2018 | Sipola et al. | |
| 2019/0211850 | A1 * | 7/2019 | Wei | F15B 13/0402 |

OTHER PUBLICATIONS

International Search Report and Written Opinion of the International Searching Authority, PCT/EP2019/073256, mailed May 4, 2020, 13 pages.

Linjama, M., "Digital Hydraulics," © 2016 Matti Linjama, TUT/IHA, (Created Sep. 19, 2016, Modified Nov. 13, 2017) 224 pages.

Heybroek, K., "On Energy Efficient Mobile Hydraulic Systems with Focus on Linear Actuation," Linköping Studies in Science and Technology Dissertations No. 1857, Linköping 2017, 103 pages.

Korean Notice of Allowance, Korean Patent Application No. 10-2022-7006151, mailed Jul. 26, 2024, 3 pages.

* cited by examiner

METHOD OF CONTROLLING A HYDRAULIC ACTUATOR, A HYDRAULIC ACTUATOR, A HYDRAULIC SYSTEM AND A WORKING MACHINE

CROSS REFERENCE TO RELATED APPLICATIONS

This application is a 35 U.S.C. § 371 national stage application of PCT International Application No. PCT/EP2019/073256 filed on Aug. 30, 2019, the disclosure and content of which is incorporated by reference herein in its entirety.

TECHNICAL FIELD

The invention relates to a method of controlling a hydraulic actuator, a hydraulic actuator, a hydraulic system comprising a hydraulic actuator and a working machine comprising a hydraulic actuator and/or a hydraulic system.

The invention is applicable on hydraulic actuators of working machines within the fields of industrial construction machines, material handling machines or construction equipment, in particular wheel loaders and excavators. Although the invention will be described with respect to an excavator, the invention is not restricted to this particular machine, but may be used in any working machine, such as wheel loaders, articulated or rigid haulers and backhoe loaders.

BACKGROUND

Hydraulic systems are used in a wide range of applications. For example, working machines typically rely on hydraulic systems to provide power for handling loads. A hydraulic system for a working machine may comprise various hydraulic actuators, for example hydraulic cylinders and rotary hydraulic machines. Hydraulic cylinders may for example be provided in a working device comprising arms and a bucket. Rotary hydraulic machines may for example be used for propulsion of a working machine and/or for a swing function of an excavator. Hydraulic hybrid systems can be used to recuperate energy from the hydraulic actuators and use it later to reduce the loading of an internal combustion engine.

Hydraulic systems comprising a dedicated high-pressure side and a dedicated low-pressure side may be referred to as dual pressure hydraulic systems, and are previously known as such. Dual pressure hydraulic systems typically comprise one or more high-pressure accumulators connected to a high-pressure side, and one or more low-pressure accumulators connected to a low-pressure side. Advantages associated with dual pressure hydraulic systems are for example improved energy efficiency and controllability.

A hydraulic cylinder comprising more than two working chambers having effective areas with a binary relationship is previously known. Such hydraulic cylinder may for example comprise four working chambers with an effective area relationship of 8:4:2:1. In case each working chamber is selectively connected to either the high-pressure side or the low-pressure side of a hydraulic system by means of a valve arrangement, the hydraulic cylinder constitutes a digital hydraulic cylinder having 16 discrete force states or pressurization states. When the largest working chamber of such hydraulic cylinder transitions between the high-pressure side and the low-pressure side in order for the hydraulic cylinder to transition between pressurization states 8 and 9, all other working chambers transition as well. The transition of a working chamber between the high-pressure side and the low-pressure side is however associated with transition losses, typically throttling losses and compressibility losses. The transition losses are highest for transitions of the largest working chamber. Transition losses are also high if all working chambers are simultaneously switched between the high-pressure side and the low-pressure side.

SUMMARY

An object of the invention is to provide a method of controlling a hydraulic actuator, which method is energy efficient, accurate, simple and/or cheap, an energy efficient, simple and/or cheap hydraulic actuator, and/or an energy efficient, simple and/or cheap hydraulic system.

According to a first aspect of the invention, the object is achieved by a method of controlling a hydraulic actuator according to claim 1. The method is carried out with a hydraulic actuator comprising a linear double-acting output member, and at least three working chambers in fluid connection with the output member, the working chambers having respective effective areas with a non-binary relationship. The method comprises selectively fluidly connecting each working chamber to either a high-pressure side or a low-pressure side to provide a plurality of discrete pressurization states of the hydraulic actuator. The method further comprises determining at least one of the pressurization states as a prevented pressurization state; and transitioning between a plurality of allowed pressurization states among the pressurization states while preventing transition to the at least one prevented pressurization state.

By means of the non-binary relationship between the respective effective areas of the working chambers, the force output of the output member while maintaining the largest working chamber connected to the high-pressure side can be lower in comparison with a binary coded hydraulic actuator. By preventing transition to at least one prevented pressurization state in a hydraulic actuator comprising working chambers having respective effective areas with a non-binary relationship, the number of transitions of working chambers between the high-pressure side and the low-pressure side can be reduced, and the energy efficiency can be improved, while still providing substantially the same force output performance. In particular, the number of transitions of the working chamber having the largest effective area between the high-pressure side and the low-pressure side can be reduced or eliminated. This in turn reduces transition losses in the hydraulic actuator and thereby increases energy efficiency.

Among the working chambers, at least two of the chambers may be arranged to generate opposite forces on the output member when connected to the high-pressure side. In addition to the non-binary relationship between the respective effective areas of the working chambers, each working chamber may have a unique effective area.

For a hydraulic actuator comprising four working chambers, there are 16 discrete pressurization states, and for a hydraulic actuator comprising three working chambers, there are eight discrete pressurization states. During operation of the hydraulic actuator, the hydraulic actuator adopts one of the pressurization states, i.e. an allowed pressurization state, providing a certain force output in the output member. In case a different force output is requested, a connection to one or more of the working chambers may be switched between the high-pressure side and the low-pressure side. By switching at least one of the working chambers, a different pressurization state is adopted by the hydraulic actuator.

Before transitioning to a different pressurization state, at least one pressurization state is categorized or determined as a prevented pressurization state, where a transition to each prevented pressurization states is prevented. Each of the remaining pressurization states may be determined as an allowed pressurization state, or it may be assumed that each pressurization state not determined as a prevented pressurization state is an allowed pressurization state. The method may comprise transitioning to the pressurization state among the allowed pressurization state that provides a force output that most closely matches a target force output of the output member. Thus, each allowed pressurization state is a candidate pressurization state to which the hydraulic actuator can transition, while each prevented pressurization state is not.

When at least one of the pressurization states is determined as a prevented pressurization state, the hydraulic actuator may be said to be controlled in a selective control. According to one example, the selective control of the hydraulic actuator is always active during operation of the hydraulic actuator. According to a further example, the selective control of the hydraulic actuator can be manually activated and deactivated, e.g. by means of a user input, such as via a display inside a cab of a working machine. Thus, the hydraulic actuator does not always need to be controlled in the selective control. According to a further example, the selective control of the hydraulic actuator can be automatically activated and deactivated, for example based on an operating condition of the hydraulic actuator, a hydraulic system and/or a working machine. The operating condition may for example include a certain boom position of a working machine, one or more points of a work cycle of a working machine, and/or a currently adopted pressurization state by the hydraulic actuator. The selective control may for example be active when lowering a boom of a working machine with an empty bucket, and inactive when lowering a boom with a heavy-loaded bucket.

The pressurization states may be put in order based on a respective force output of the output member in each pressurization state (for the same pressures in the high-pressure side and the low-pressure side). Thus, a lowest pressurization state is the pressurization state generating the lowest force output in the output member and the highest pressurization state is the pressurization state generating the highest force output in the output member. Correspondingly, two pressurization states having most closely matching force output in the output member are said to be immediately adjacent pressurization states. Except for the lowest pressurization state and the highest pressurization state, each pressurization state has two immediately adjacent pressurization state (one "on each side"), i.e. one that generates the same or least lower force output and one that generates the same or least higher force output. Furthermore, two allowed pressurization states having most closely matching force output in the output member are said to be immediately adjacent allowed pressurization states, although a prevented pressurization state may be provided between these two immediately adjacent allowed pressurization states.

In case the hydraulic actuator comprises four working chambers, pressurized hydraulic fluid in the largest working chamber and in the third largest working chamber may generate a force output of the output member in one direction (e.g. in an extending direction), and pressurized hydraulic fluid in the second largest working chamber and in the smallest working chamber may generate a force output of the output member in an opposite direction (e.g. in a retracting direction). In case the hydraulic actuator comprises only three working chambers, pressurized hydraulic fluid in the largest working chamber and in the smallest working chamber may generate a force output of the output member in one direction (e.g. in an extending direction), and pressurized hydraulic fluid in the second largest working chamber may generate a force output of the output member in an opposite direction (e.g. in a retracting direction). Thus, in comparison with a four-chamber hydraulic actuator, the fourth and smallest working chamber may be omitted for a three-chamber hydraulic actuator. The hydraulic actuator may also comprise more than four working chambers, such as five or six working chambers.

According to one embodiment, the method is carried out in a hydraulic system comprising a high-pressure side, a low-pressure side, and a valve arrangement arranged to selectively fluidly connect each working chamber to either the high-pressure side or the low-pressure side to provide the plurality of discrete pressurization states of the hydraulic actuator.

Since the valve arrangement is arranged to selectively fluidly connect each working chamber to either the high-pressure side or the low-pressure side to provide a plurality of discrete pressurization states of the hydraulic actuator, the hydraulic actuator is a digital hydraulic actuator. The valve arrangement may be arranged to selectively fluidly connect each working chamber to either the high-pressure side or the low-pressure side independently of the remaining working chambers. The valve arrangement may comprise a plurality of valves, for example one or two valves associated with each working chamber. Each valve may be a proportional valve. Alternatively, each valve may be an on/off valve. When each valve is either fully open or fully closed, a plurality of discrete force states or pressurization states are provided for constant pressures in the high-pressure side and in the low-pressure side.

The high pressure in the high-pressure side is higher than the low pressure in the low-pressure side during operation of the hydraulic system. The pressures in the high-pressure side and the low-pressure side are not limited to any specific pressure values. Rather, the terminologies "high pressure" and "low pressure" indicate that these pressure levels are different and that the high pressure is higher than the low pressure. The pressure levels in the high-pressure side and the low-pressure side are selected depending on each configuration. The pressure levels in the high-pressure side and the low-pressure side may vary during operation of the hydraulic system.

The high-pressure side may be referred to as a primary side or primary source of hydraulic power arranged to both produce and receive a volume flow at a first pressure level and the low-pressure side may be referred to as a secondary side or secondary source of hydraulic power arranged to both produce and receive a volume flow at a second pressure level, lower than the first pressure level.

According to one embodiment, at least two of the working chambers have respective effective areas with a substantially binary relationship, or binary relationship. According to one example, the area relationship is 8:3:2:1 or 7:3:2:1. Each of these area relationships provides two force output plateaus, for pressurization states 4 and 5 and for pressurization states 12 and 13. According to a further example, the area relationship is 6:3:2:1. This area relationship provides three force output plateaus, for pressurization states 4 and 5, pressurization states 8 and 9, and pressurization states 12 and 13.

With a substantially binary relationship, the effective area of the second smallest working chamber may deviate less than 20%, such as less than 15%, such as less than 10%, such as less than 5%, from twice the effective area of the smallest working chamber. Alternatively, or in addition, with a substantially binary relationship, the effective area of the third smallest working chamber may deviate less than 20%, such as less than 15%, such as less than 10%, such as less than 5% from four times the effective area of the smallest working chamber.

According to one embodiment, the hydraulic actuator comprises at least four working chambers, and at least three of the working chambers have respective effective areas with a substantially binary relationship, or binary relationship. In this case, a working chamber other than the at least three working chambers may have the largest effective area.

The non-binary relationship of the respective effective areas of the working chambers may for example be 6-8:3-5:1.5-2.5:0.5-1.5, such as 6.5-7.0:3.9-4.1:1.9-2.1:0.95-1.05, such as 6.5-7:4:2:1. According to one example, the area relationship is 7:4:2:1. With this area relationship, the force output is the same in pressurization states 8 and 9. Thus, pressurization states 8 and 9 provide a plateau in terms of force output. According to a further example, the area relationship is 6.5:4:2:1. With this area relationship, the force output step size between pressurization states 7-10, is half the force output step size between pressurization states 1-7 and 10-16. According to a further example, the area relationship is 6:4:2:1. This area relationship provides two force output plateaus, for pressurization states 7 and 8, and pressurization states 9 and 10.

The effective areas of a hydraulic actuator comprising at least three working chambers having a non-binary relationship may refer to the effective area of at least one of the working chambers having a non-binary relationship to the effective areas of at least some of the effective areas of the other working chambers. The effective areas of the other working chambers may or may not have a binary relationship to one another.

According to one embodiment, the hydraulic actuator comprises at least four working chambers, and the fourth smallest effective area is 2.75-3.75 times the second smallest effective area. In this case, the three smallest effective areas or the two smallest effective areas may have a substantially binary relationship, or binary relationship. Alternatively, or in addition, the largest effective area may be 2.75-3.75 times the third largest effective area.

According to one embodiment, the hydraulic actuator may comprise at least four working chambers, and the fourth smallest effective area may be 6-7.5 times the smallest effective area. Also in this case, the three smallest effective areas or the two smallest effective areas may have a substantially binary relationship, or binary relationship. Alternatively, or in addition, the largest effective area may be 6-7.5 times the fourth largest effective area. For example, the non-binary relationship of the respective effective areas of the working chambers may be 6-8:3-5:1.5-2.5:0.5-1.5, such as 6.5-7.0:3.9-4.1:1.9-2.1:0.95-1.05, such as 6.5-7:4:2:1.

According to one embodiment, the pressurization states are put in order based on a respective force output of the output member in each pressurization state, and the method further comprises switching less than all working chambers between the high-pressure side and the low-pressure side when transitioning from each allowed pressurization state to an immediately adjacent allowed pressurization state. Thus, the hydraulic actuator can sequentially transition through all allowed pressurization states without having to simultaneously switch all working chambers. In this way, transition losses can be further reduced.

According to one embodiment, the pressurization states are put in order based on a respective force output of the output member in each pressurization state, and the method further comprises transitioning between two of the allowed pressurization states by skipping one or more of the at least one prevented pressurization state. In some situations, the method may thus comprise transitioning to a pressurization state that does not most closely match a target force output. However, by switching to an allowed pressurization state that is close enough to the target force output, excessive high-pressure/low-pressure transitions for one or more working chambers can be avoided. The force output can then be made to accurately match the target force output by throttling through the valve arrangement.

For example, during a force decrease of the output member, the force of the output member may be controlled to decrease by transitioning from a relatively high allowed pressurization state to a relatively low allowed pressurization state by skipping an intermediate prevented pressurization state, wherein for constant pressures in the high-pressure side and the low-pressure side, the intermediate prevented pressurization state corresponds to an intermediate force in the output member, the relatively high allowed pressurization state corresponds to a relatively high force in the output member, and the relatively low allowed pressurization state corresponds to a relatively low force in the output member; and wherein the intermediate force is higher than, or equal to, the relatively low force, and the intermediate force is lower than, or equal to, the relatively high force.

The determination of at least one pressurization state as a prevented pressurization states may be static or dynamic. According to one embodiment, the method further comprises determining one or more of the at least one prevented pressurization state in dependence of a currently adopted pressurization state. In this way, the categorization of the pressurization states is made dynamic.

According to one embodiment, the method further comprises determining one or more of the at least one prevented pressurization state in dependence of whether the working chamber having the largest effective area is connected to the high-pressure side or the low-pressure side. In this way, a hysteresis effect can be introduced which further reduces transition losses associated with the working chamber having the largest effective area. Also this categorization of the at least one prevented pressurization state is dynamic.

Thus, the at least one prevented pressurization state when the working chamber having the largest effective area is connected to the high-pressure side may be different from the at least one prevented pressurization state when the working chamber having the largest effective area is connected to the low-pressure side. For example, when the working chamber having the largest effective area is connected to the high-pressure side, the allowed pressurization states may comprise all pressurization states where the working chamber having the largest effective area is connected to the high-pressure side. Conversely, when the working chamber having the largest effective area is connected to the low-pressure side, the allowed pressurization states may comprise all pressurization states where the working chamber having the largest effective area is connected to the low-pressure side.

According to one embodiment, the method further comprises determining one or more of the plurality of allowed pressurization states in dependence of whether the working chamber having the largest effective area is connected to the high-pressure side or the low-pressure side.

According to one embodiment, the method further comprises determining one or more of the plurality of allowed pressurization states and/or one or more of the at least one prevented pressurization state in dependence of whether the working chamber having the second largest effective area is connected to the high-pressure side or the low-pressure side. In this way, a hysteresis effect can be introduced which further reduces transition losses associated with the working chamber having the second largest effective area. For example, at least one prevented pressurization state when the working chamber having the second largest effective area is connected to the high-pressure side may be different from at least one prevented pressurization state when the working chamber having the second largest effective area is connected to the low-pressure side.

According to one embodiment, the working chamber having the largest effective area is connected to the high-pressure side in each allowed pressurization state, or the working chamber having the largest effective area is connected to the low-pressure side in each allowed pressurization state. Thus, the working chamber having the largest effective area may be connected to the same of one of the high-pressure side and the low-pressure side in each pressurization state of the allowed pressurization states.

For example, if the working chamber having the largest effective area is connected to the high-pressure side in each allowed pressurization state in a hydraulic actuator having four working chambers with an area coding or area relationship of 7:4:2:1, each of pressurization states 9-16 is allowed and each of pressurization states 1-8 are prevented. In this way, transition of the working chamber having the largest effective area is prevented and the energy recovery is very high.

As a further example, if the working chamber having the largest effective area is connected to the low-pressure side in each allowed pressurization state in a hydraulic actuator having four working chambers with an area relationship of 7:4:2:1, each of pressurization states 1-8 is allowed and each of pressurization states 9-16 are prevented. In this way, transition of the working chamber having the largest effective area is prevented and the acceleration is not limited by the categorization of pressurization states.

According to one embodiment, the pressurization states are put in order based on a respective force output of the output member in each pressurization state, and for constant pressures in the high-pressure side and the low-pressure side, a difference between a force output of the output member in one of the allowed pressurization states and a force output of the output member in one of the prevented pressurization states, is smaller than a difference between force outputs of the output member in two immediately adjacent allowed pressurization states.

According to one embodiment, for constant pressures in the high-pressure side and the low-pressure side, a force output of the output member in one of the allowed pressurization states and a force output of the output member in one of the prevented pressurization states are the same, or substantially the same (e.g. less than 5% difference). Thus, two or more pressurization states can produce the same or substantially the same force output while having different pressurizations of the working chambers. This enables operation of the hydraulic actuator in a larger force output range without having to switch connection of a certain working chamber between the high-pressure side and the low-pressure side. Thereby, an energy efficient control of the hydraulic actuator can be made more versatile since more often, acceptable acceleration of the output member can be reached without switching the largest working chamber. Although the other working chambers do transitions, these transitions have less impact on energy efficiency since the involved area and volume under transition are smaller.

According to one embodiment, the pressurization states are put in order based on a respective force output of the output member in each pressurization state, and for constant pressures in the high-pressure side and the low-pressure side, a difference between a force output of the output member in one of the allowed pressurization states and a force output of the output member in an immediately adjacent prevented pressurization state, is less than 70%, such as less than 50%, such as less than 45% of a difference between a force output of the output member in the one of the allowed pressurization states and a force output of the output member in an immediately adjacent allowed pressurization state.

According to a second aspect, the object is achieved by a hydraulic actuator. The hydraulic actuator comprises a linear double-acting output member; and at least three working chambers in fluid connection with the output member, the working chambers having respective effective areas with a non-binary relationship. At least two of the working chambers have respective effective areas with a substantially binary relationship, or binary relationship.

According to one embodiment, the hydraulic actuator comprises at least four working chambers, and the fourth smallest effective area is 2.75-3.75 times the second smallest effective area. Alternatively, or in addition, the largest effective area may be 2.75-3.75 times the third largest effective area.

According to one embodiment, the hydraulic actuator comprises at least four working chambers, and the fourth smallest effective area is 6-7.5 times the smallest effective area. Alternatively, or in addition, the largest effective area may be 6-7.5 times the fourth largest effective area.

According to one embodiment, the hydraulic actuator comprises at least four working chambers having respective effective areas with a non-binary relationship; and two of the working chambers have respective effective areas with a substantially binary relationship, or binary relationship. Examples of such area relationships are 8:3:2:1, 7:3:2:1 and 6:3:2:1.

According to one embodiment, the hydraulic actuator comprises at least four working chambers, and at least three of the working chambers have respective effective areas with a substantially binary relationship, or binary relationship. In this case, a working chamber other than the at least three working chambers may have the largest effective area. Examples of such area relationships are 7:4:2:1, 6.5:4:2:1 and 6:4:2:1.

According to a third aspect, the object is achieved by a hydraulic system. The hydraulic system comprising a hydraulic actuator having a linear double-acting output member, and at least three working chambers in connection with the output member, the working chamber have respective effective areas with a non-binary relationship; a high-pressure side; a low-pressure side; a valve arrangement arranged to selectively fluidly connect each working chamber to either the high-pressure side or the low-pressure side to provide a plurality of discrete pressurization states of the hydraulic actuator; and a control system configured to control the hydraulic actuator by controlling the valve arrangement. The control system is configured to determine at least one of the pressurization states as a prevented pressurization state; and control the hydraulic actuator to transition between a plurality of allowed pressurization states among the pressurization states while preventing transitioning to the at least one prevented pressurization state.

The control system preferably comprises a control unit. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to one embodiment, at least two of the working chambers have respective effective areas with a substantially binary relationship, or binary relationship. Examples of such area relationships are 8:3:2:1, 7:3:2:1, 6:3:2:1, 7:4:2:1, 6.5:4:2:1 and 6:4:2:1.

According to one embodiment, the hydraulic actuator comprises at least four working chambers having respective effective areas with a non-binary relationship; and two of the working chambers have respective effective areas with a substantially binary relationship, or binary relationship. Examples of such area relationships are 8:3:2:1, 7:3:2:1 and 6:3:2:1.

According to one embodiment, the hydraulic actuator comprises at least four working chambers, and at least three of the working chambers have respective effective areas with a substantially binary relationship, or binary relationship. In this case, the working chamber other than the at least three working chambers may have the largest effective area. Examples of such area relationships are 7:4:2:1, 6.5:4:2:1 and 6:4:2:1.

The invention also relates to a hydraulic system configured to carry out a method according to the present invention.

The invention also relates to a working machine comprising a hydraulic actuator according to the invention and/or a hydraulic system according to the invention. The working machine may be a material handling machines or a construction machine, in particular a wheel loader or an excavator.

Further advantages and advantageous features of the invention are disclosed in the following description.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
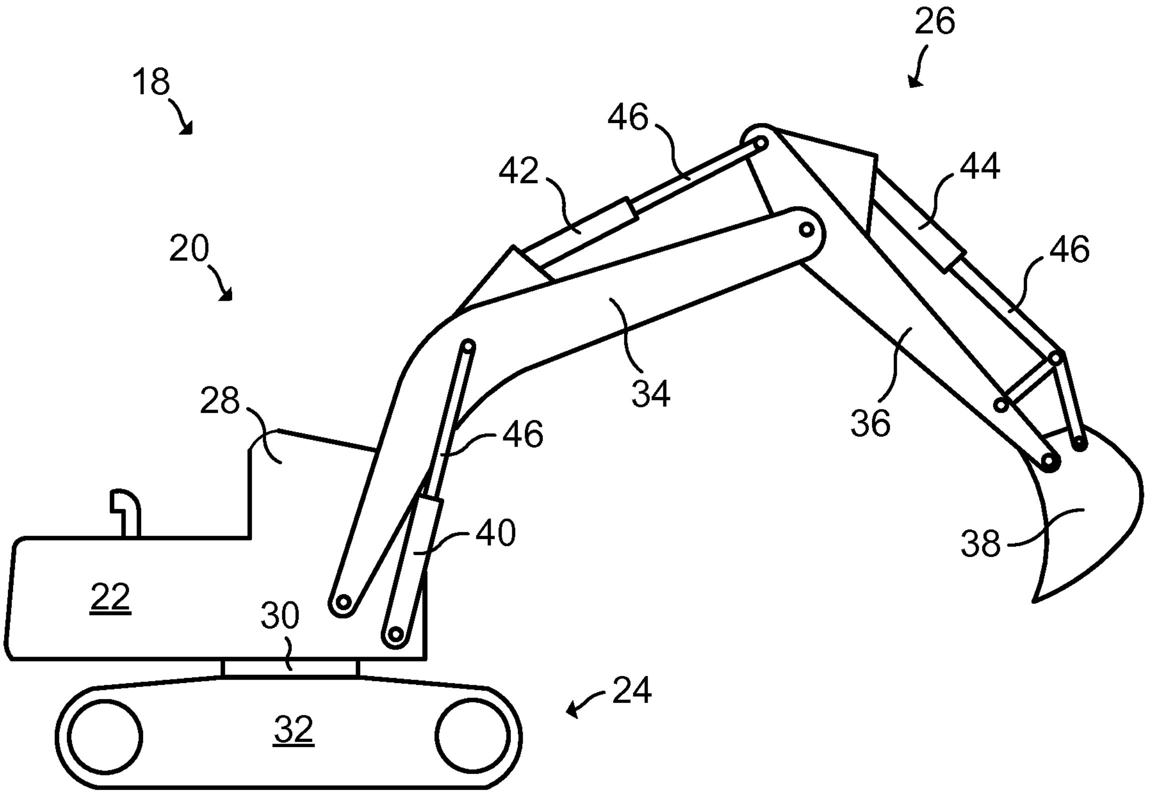
FIG. 1 is a schematic illustration of a working machine according to the invention comprising a hydraulic system.

In the following, a method of controlling a hydraulic actuator, a hydraulic actuator, a hydraulic system comprising a hydraulic actuator and a working machine comprising a hydraulic actuator and/or a hydraulic system, will be described. The same or similar reference numerals will be used to denote the same or similar structural features.

FIG. 1 is a schematic illustration of a working machine 18 according to the invention. The working machine 18 comprises a hydraulic system 20 according to the invention. The working machine 18 is exemplified as an excavator. The working machine 18 comprises an upper swing structure 22, a lower travel structure 24 and a working device 26. The working machine 18 further comprises a cab 28 in the upper swing structure 22, and a swing motor 30 between the upper swing structure 22 and the lower travel structure 24. The lower travel structure 24 comprises two travel motors 32 (only one is visible in FIG. 1) for driving a respective crawler track.

The working device 26 comprises a boom 34, an arm 36 and a bucket 38. The working device 26 further comprises two hydraulic actuators 40 (only one is visible in FIG. 1) exemplified as boom cylinders, a hydraulic actuator 42 exemplified as an arm cylinder and a hydraulic actuator 44 exemplified as a bucket cylinder. The hydraulic actuators 40 operate between the upper swing structure 22 and the boom 34 by means of a linear double-acting output member 46. The hydraulic actuator 42 operates between the boom 34 and the arm 36 by means of a linear double-acting output member 46. The hydraulic actuator 44 operates between the arm 36 and the bucket 38 by means of a linear double-acting output member 46. In this example, each output member 46 is a piston rod.

Figure 2:
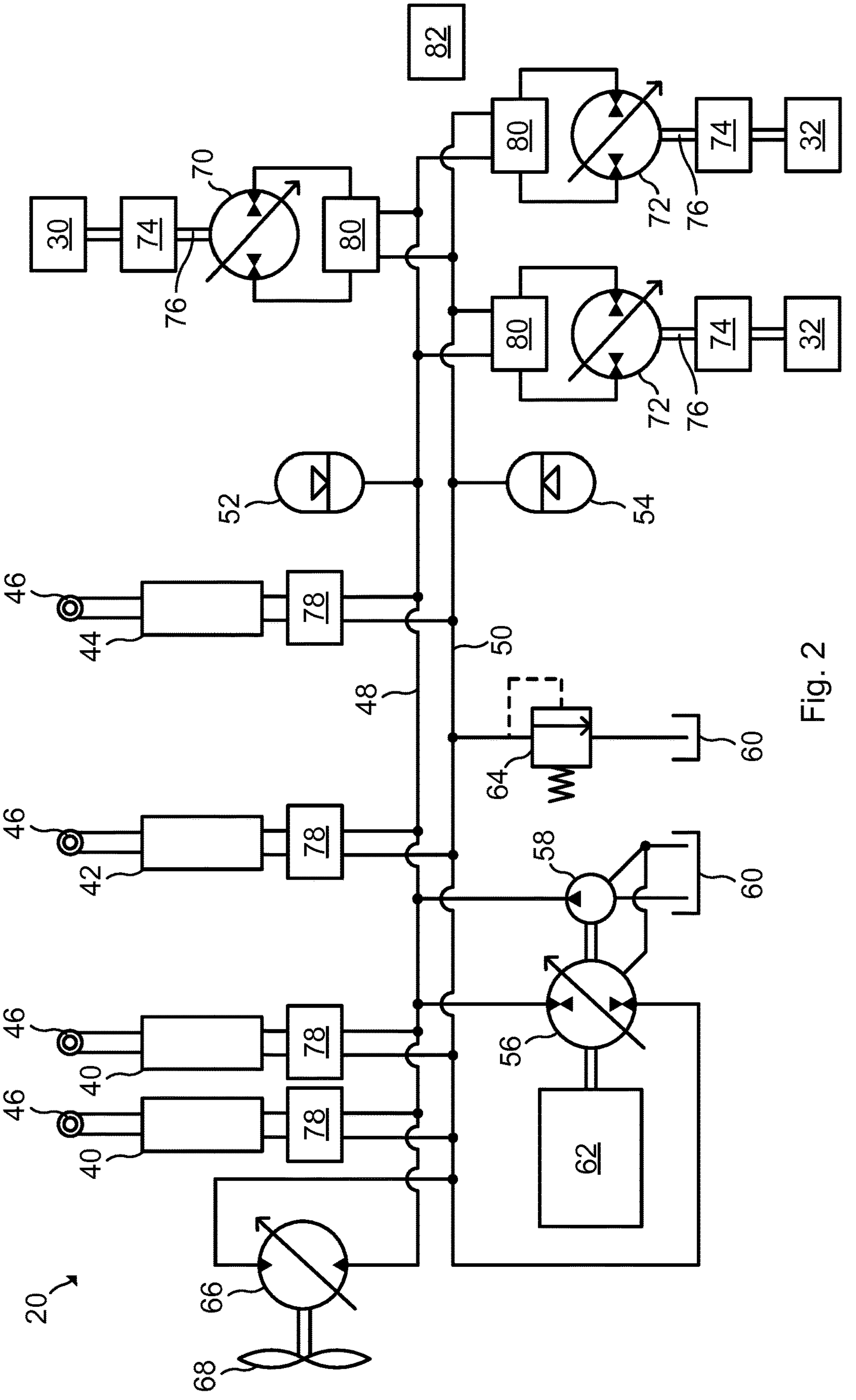
FIG. 2 is a block diagram of the hydraulic system in FIG. 1.

FIG. 2 is a block diagram of the hydraulic system 20 in FIG. 1 according to an embodiment of the invention. The hydraulic system 20 comprises a high-pressure side 48 and a low-pressure side 50. In the example in FIG. 2, the high-pressure side 48 and the low-pressure side 50 are arranged in a common pressure rail (CPR) architecture. The high-pressure side 48 comprises a high-pressure rail and the low-pressure side 50 comprises a low-pressure rail. The high-pressure side 48 and the low-pressure side 50 may alternatively be referred to as a high-pressure circuit and a low-pressure circuit, respectively. The high-pressure side 48 and the low-pressure side 50 form a dual pressure system comprising two charging circuits at different pressure levels (the high-pressure side 48 and the low-pressure side 50). The hydraulic system 20 thus comprises a dedicated high-pressure side 48 and a dedicated low-pressure side 50. The dual pressure hydraulic system 20 differs from load sensing hydraulic systems where pressure is to a substantially larger extent adjusted depending on load, i.e. a resistive control.

During operation of the hydraulic system 20, the pressure in the high-pressure side 48 is higher than the pressure in the low-pressure side 50. These pressure levels may vary somewhat during operation of the hydraulic system 20 while the pressure in the high-pressure side 48 is higher than the pressure in the low-pressure side 50. The high pressure in the high-pressure side 48 may for example be 200-350 bars±10%, such as 250 bars±10%, during operation of the hydraulic system 20. The low pressure in the low-pressure side 50 may for example be 15-30 bars±10% during operation of the hydraulic system 20. The high pressure in the high-pressure side 48 may for example be 330 bars when the hydraulic actuators 40 are in a low position and 200 bars when the hydraulic actuators 40 are in a high position.

The hydraulic system 20 further comprises a high-pressure hydraulic energy storage 52 and a low-pressure hydraulic energy storage 54. The high-pressure hydraulic energy storage 52 is connected to the high-pressure side 48 and the low-pressure hydraulic energy storage 54 is connected to the low-pressure side 50. In FIG. 2, each of the high-pressure hydraulic energy storage 52 and the low-pressure hydraulic energy storage 54 is exemplified as an accumulator. The high-pressure hydraulic energy storage 52 can store/release hydraulic energy from/to the high-pressure side 48. The low-pressure hydraulic energy storage 54 can store/release hydraulic energy from/to the low-pressure side 50. The high-pressure hydraulic energy storage 52 requires a higher energy storage capacity in case the pressure variation in the high-pressure side 48 is low and vice versa. The same applies for the low-pressure hydraulic energy storage 54 with respect to the low-pressure side 50.

The hydraulic system 20 further comprises a main pump 56. In FIG. 2, the main pump 56 is connected to the high-pressure side 48 and the low-pressure side 50. The main pump 56 is arranged to pressurize the high-pressure side 48. The main pump 56 is here exemplified as a variable displacement hydraulic machine operative as both pump and motor.

The hydraulic system 20 further comprises an auxiliary pump 58. In the example in FIG. 2, the auxiliary pump 58 is arranged to supply pressurized fluid from a tank 60 to the high-pressure side 48. The auxiliary pump 58 of this example is a fixed displacement pump. The main pump 56 and the auxiliary pump 58 are connected to a common drive shaft driven by an internal combustion engine 62 of the working machine 18.

The hydraulic system 20 of this example further comprises a pressure relief valve 64 connected between the low-pressure side 50 and the tank 60. The hydraulic system 20 further comprises a fan motor 66, and a fan 68 arranged to be driven by the fan motor 66.

The hydraulic system 20 further comprises three variable displacement hydraulic machines 70, 72. The hydraulic machine 70 is arranged to rotationally drive the swing motor 30 and each of the two hydraulic machines 72 is arranged to rotationally drive a respective travel motor 32.

The hydraulic system 20 further comprises three gearboxes 74. One gearbox 74 is arranged between a hydraulic machine 70 and the swing motor 30, and one gearbox 74 is arranged between each hydraulic machine 72 and a respective travel motor 32. Each gearbox 74 is driven by a drive shaft 76 of a respective hydraulic machine 70, 72.

The hydraulic system 20 further comprises a plurality of valve arrangements 78, 80. Each valve arrangement 78 is associated with one of the hydraulic actuators 40, 42, 36. One valve arrangement 80 is associated with the swing motor 30 and one valve arrangement 80 is associated with each travel motor 32. Each valve arrangement 78, 80 is in fluid communication with the high-pressure side 48 and the low-pressure side 50.

The hydraulic system 20 further comprises a control system 82. The control system 82 comprises a data processing device and a memory having a computer program stored thereon, the computer program comprising program code which, when executed by the data processing device causes the data processing device to perform various steps, or command execution of various steps, as described herein.

Figure 3A:
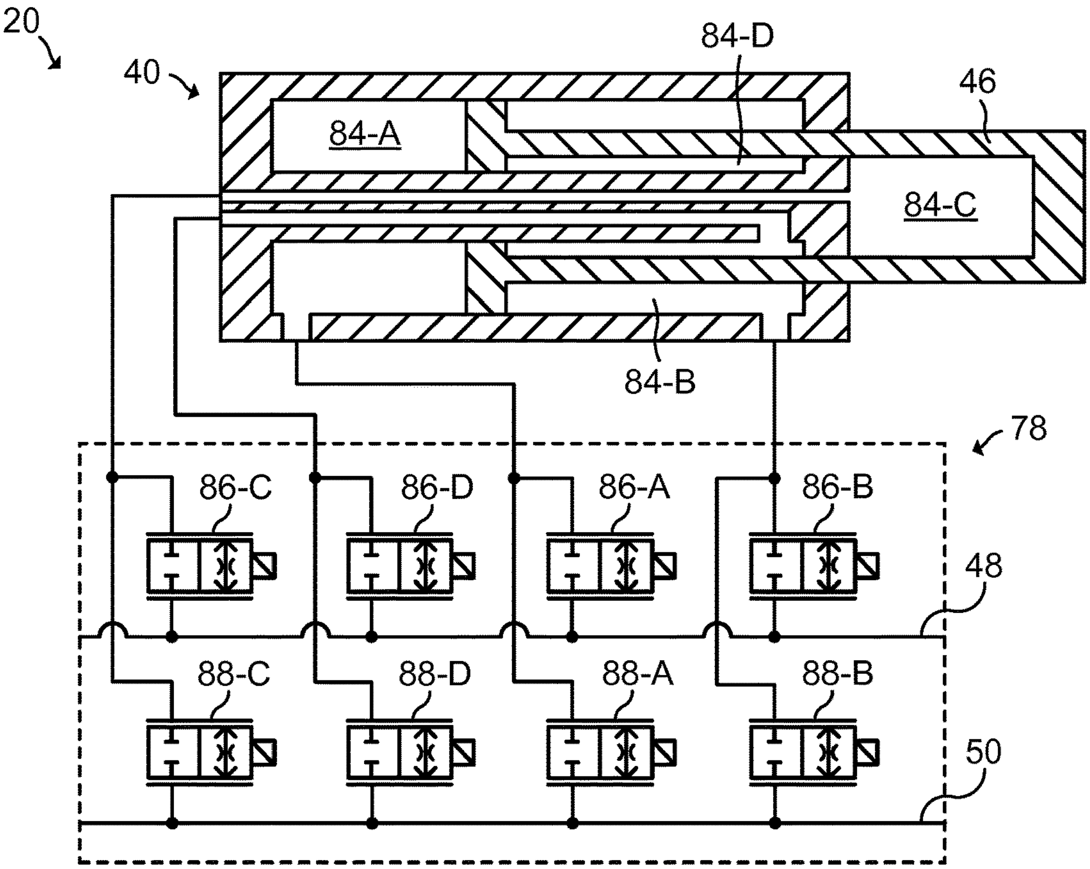
FIG. 3*a* is a partial block diagram of the hydraulic system showing a hydraulic actuator and a valve arrangement.

FIG. 3*a* is a partial block diagram of the hydraulic system 20 showing one of the hydraulic actuators 40 and the associated valve arrangement 78. One, several or each of the hydraulic actuators 40, 42 may be of the same design as in FIG. 3*a*. The hydraulic actuator 40 comprises four variable volume working chambers 84-A, 84-B, 84-C, 84-D, i.e. a first working chamber or “A-chamber” 84-A, a second working chamber or “B-chamber” 84-B, a third working chamber or “C-chamber” 84-C and a fourth working chamber or “D-chamber” 84-D. Each working chamber 84-A, 84-B, 84-C, 84-D may also be referred to with reference numeral “84”.

Figure 3B:
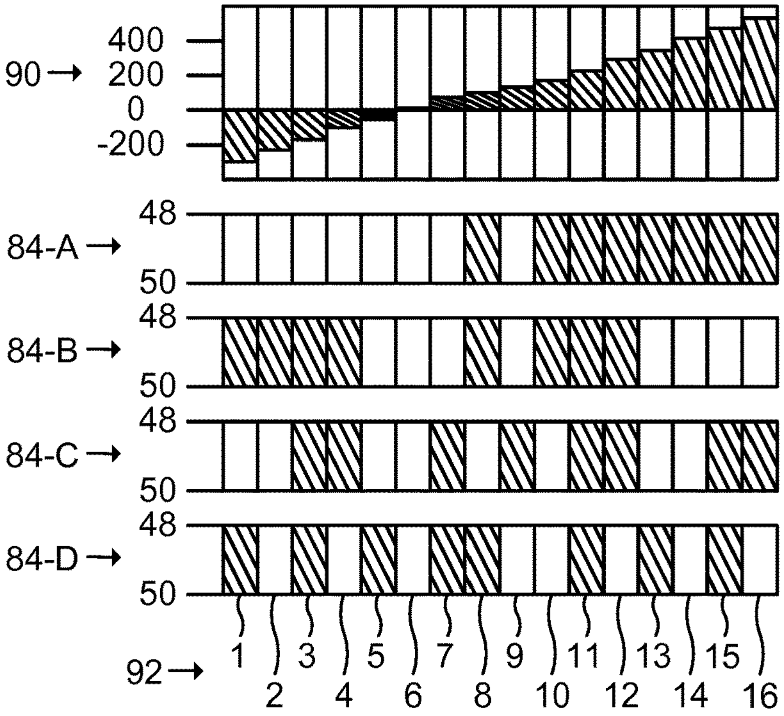
FIG. 3*b* is a diagram showing a force output of an output member for a plurality of pressurization states of the hydraulic actuator in FIG. 3*a*.

The working chambers 84 in FIGS. 3*a* and 3*b* have respective effective areas with a non-binary relationship of 6.5:4:2:1. Thus, the first working chamber 84-A has an effective area that is 6.5 times the effective area of the fourth working chamber 84-D, the second working chamber 84-B has an effective area that is four times the effective area of the fourth working chamber 84-D, and the third working chamber 84-C has an effective area that is two times the effective area of the fourth working chamber 84-D. Although the four working chambers 84 have effective areas with a non-binary relationship, the second working chamber 84-B, the third working chamber 84-C and the fourth working chamber 84-D have a binary relationship of 4:2:1.

The valve arrangement 78 is configured to selectively fluidly connect each working chamber 84 to either the high-pressure side 48 or the low-pressure side 50. Thereby, the hydraulic actuator 40 can adopt 16 discrete pressurization states. The valve arrangement 78 of this example comprises eight proportional valves 86-A, 86-B, 86-C, 86-D, 88-A, 88-B, 88-C, 88-D. Each valve 86-A, 86-B, 86-C, 86-D may also be referred to with reference numeral “86” and each valve 88-A, 88-B, 88-C, 88-D may also be referred to with reference numeral “88”.

The valve 86-A is provided between the high-pressure side 48 and the first working chamber 84-A, the valve 88-A is provided between the low-pressure side 50 and the first working chamber 84-A, the valve 86-B is provided between the high-pressure side 48 and the second working chamber 84-B, the valve 88-B is provided between the low-pressure side 50 and the second working chamber 84-B, the valve 86-C is provided between the high-pressure side 48 and the third working chamber 84-C, the valve 88-C is provided between the low-pressure side 50 and the third working chamber 84-A, the valve 86-D is provided between the high-pressure side 48 and the fourth working chamber 84-D, and the valve 88-D is provided between the low-pressure side 50 and the fourth working chamber 84-D. Although the proportional valves 86, 88 provide 16 discrete pressurization states in the hydraulic actuator 40, hydraulic fluid may be throttled into or out from each working chamber 84 by means of an associated valve 86, 88 to alter the discrete force output. The throttling however generates losses.

Transition losses occurs when switching a connection to any of the working chambers 84 between the high-pressure side 48 and the low-pressure side 50. The highest transition losses occur when transitioning the first working chamber

84-A between the high-pressure side 48 and the low-pressure side 50 since the first working chamber 84-A has the largest effective area.

FIG. 3*b* is a diagram showing a force output 90 (in kN) of the output member 46 for a plurality of pressurization states 1-16 of the hydraulic actuator 40 in FIG. 3*a*. The pressurization states 1-16 are also referred to with reference numeral "92". The two hydraulic actuators 40 of the working machine 18 may have an offset in force to increase the force resolution from 16 discrete force levels to 32 discrete force levels.

When the first working chamber 84-A is fluidly connected to the high-pressure side 48, the pressure within the first working chamber 84-A generates a force on the output member 46 in an extending direction (to the right in FIG. 3*a*). When the second working chamber 84-B is fluidly connected to the high-pressure side 48, the pressure within the second working chamber 84-B generates a force on the output member 46 in a retracting direction (to the left in FIG. 3*a*). When the third working chamber 84-C is fluidly connected to the high-pressure side 48, the pressure within the third working chamber 84-C generates a force on the output member 46 in the extending direction. When the fourth working chamber 84-D is fluidly connected to the high-pressure side 48, the pressure within the fourth working chamber 84-D generates a force on the output member 46 in the retracting direction.

As shown in FIG. 3*b*, the pressurization states 1-16 are put in order based on the corresponding force output 90. Pressurization state 1 provides the lowest force output 90 (a negative force output 90) and pressurization state 16 provides the highest force output 90 etc.

A negative force output 90 may for example be required for "return to dig", i.e. in order to rapidly accelerate the boom 34 downwards with an empty bucket 38. If the force that the hydraulic actuator 40 can produce while maintaining the first working chamber 84-A connected to the high-pressure side 48 is not low enough, the first working chamber 84-A may need to be switched to the low-pressure side 50.

With the non-binary area relationship of 6.5:4:2:1 of the working chambers 84, the step size (i.e. the difference in force output 90) between pressurization states 7-8, 8-9, and 9-10 is half of the step size between pressurization states 1-2, 2-3, 3-4, 4-5, 5-6, 6-7, 10-11, 11-12, 12-13, 13-14, 14-15 and 15-16. Furthermore, in comparison with a binary coded hydraulic actuator, the hydraulic actuator 40 in FIGS. 3*a* and 3*b* can produce lower force outputs 90 while maintaining the first working chamber 84-A connected to the high-pressure side 48. Thereby, energy recovery by means of the high-pressure hydraulic energy storage 52 can be improved.

In the method of controlling the hydraulic actuator 40, at least one of the pressurization states 92 is determined as a prevented pressurization state to which the hydraulic actuator 40 is prevented from transitioning. Each of the remaining pressurization states 92 is an allowed pressurization state to which the hydraulic actuator 40 is allowed to transition. In order to provide a target force output 90 in the output member 46, the hydraulic actuator 40 may be controlled to transition to the allowed pressurization state associated with a force output 90 that most closely matches the target force output 90, while preventing transition to any of the at least one prevented pressurization state.

The target force output 90 may for example be calculated base on target position, target speed and/or target acceleration of the output member 46, e.g. by means of the control system 82. The control system 82 may control the valve arrangement 78 to switch pressurization of at least one of the working chambers 84 in order to effect a transition of the hydraulic actuator 40 between two pressurization states 92. The control system 82 may also contain various logic functions for determining which pressurization state 92 that is/are currently prevented, e.g. given certain operating conditions of the hydraulic actuator 40 and/or of the working machine 18, a certain operating pattern and/or a posture of the working machine 18.

To accelerate the boom 34 (see FIG. 1) downwards, the force output 90 of the output member 46 is reduced. If the force output 90 that the hydraulic actuator 40 can produce while maintaining the first working chamber 84-A in fluid connection with the high-pressure side 48 is not low enough for the requested acceleration, the first working chamber 84-A will transition from the high-pressure side 48 to the low-pressure side 50. A further transition of the first working chamber 84-A may occur when a target velocity is reached and the acceleration becomes close to zero.

According to one example, pressurization state 9 is prevented when the hydraulic actuator 40 adopts any of pressurization states 8 or 10-16, i.e. when the first working chamber 84-A is connected to the high-pressure side 48. If the control system 82 determines that the force output 90 of pressurization state 9 would be most suitable, the control system 82 may instead command a transition to pressurization state 8 since pressurization state 9 is prevented. Although the force output 90 of pressurization state 8 does not give an as good force match as pressurization state 9, the energy costly depressurization of the first working chamber 84-A will be avoided. When transitioning from any of pressurization states 8 or 10-16 to an adjacent pressurization state among the allowed pressurization states 1-8 or 10-16, less than all working chambers 84 are switched between the high-pressure side 48 and the low-pressure side 50. For example, when transitioning from pressurization state 10 to pressurization state 8, pressurization state 9 is skipped and only the fourth working chamber 84-D is switched.

In this example, a difference between the force outputs 90 of the allowed pressurization state 10 and the prevented pressurization state 9 is smaller than a difference between the force outputs 90 of, for example, the immediately adjacent pressurization states 10 and 11. Furthermore, a difference between the force outputs 90 of the allowed pressurization state 10 and the immediately adjacent prevented pressurization state 9 is approximately 50% of the difference between the force outputs 90 of the immediately adjacent allowed pressurization states 10 and 11.

Furthermore, pressurization state 8 is prevented when the hydraulic actuator 40 adopts any of pressurization states 1-7 or 9, i.e. when the first working chamber 84-A is connected to the low-pressure side 50. When transitioning from any of pressurization states 1-7 or 9 to an adjacent pressurization state among the allowed pressurization states 1-7 or 9-16, less than all working chambers 84 are switched between the high-pressure side 48 and the low-pressure side 50. For example, when transitioning from pressurization state 7 to pressurization state 9, pressurization state 8 is skipped and only the fourth working chamber 84-D is switched.

In this example, a difference between the force outputs 90 of the prevented pressurization state 8 and the allowed pressurization state 7 is smaller than a difference between the force outputs 90 of, for example, the immediately adjacent pressurization states 1 and 2. Furthermore, a difference between the force outputs 90 of the prevented pressurization state 8 and the immediately adjacent pressurization state 7 is 50% of the difference between the force outputs 90 of the immediately adjacent allowed pressurization states 6 and 7.

In the above two examples, the plurality of allowed pressurization states and the at least one prevented pressurization state are determined in dependence of whether the first working chamber 84-A is connected to the high-pressure side 48 or to the low-pressure side 50. Moreover, the plurality of allowed pressurization states and the at least one prevented pressurization state are different when the first working chamber 84-A is connected to the high-pressure side 48 and when the first working chamber 84-A is connected to the low-pressure side 50.

Figure 4A:
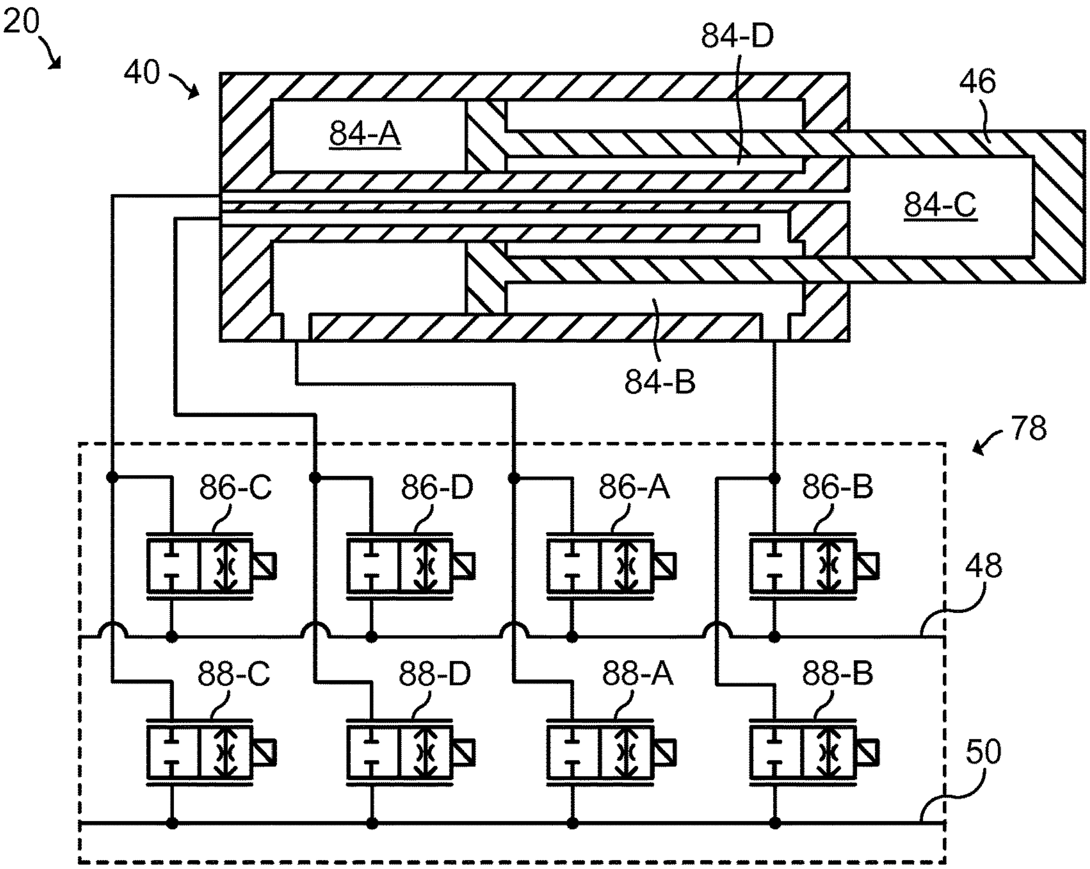
FIG. 4*a* is a partial block diagram of the hydraulic system showing a further example of hydraulic actuator and a valve arrangement.
Figure 4B:
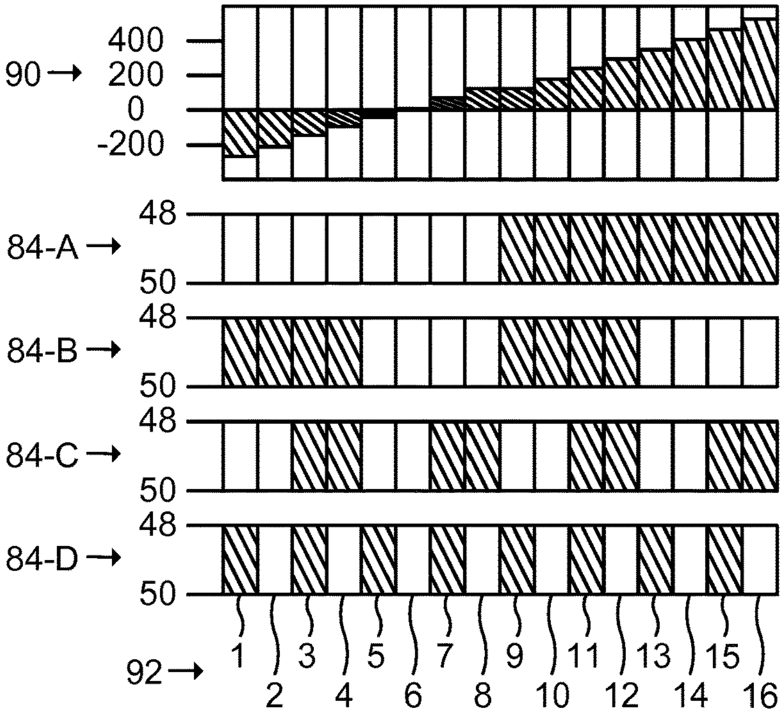
FIG. 4*b* is a diagram showing a force output of an output member for a plurality of pressurization states of the hydraulic actuator in FIG. 4*a*.

FIG. 4*a* is a partial block diagram of the hydraulic system 20 showing a further example of hydraulic actuator 40 and a valve arrangement 78. One, several or each of the hydraulic actuators 40, 42 may be of the same design as in FIG. 4*a*. FIG. 4*b* is a diagram showing a force output 90 of an output member 46 for a plurality of pressurization states 92 of the hydraulic actuator 40 in FIG. 4*a*. With collective reference to FIGS. 4*a* and 4*b*, mainly differences with respect to FIGS. 3*a* and 3*b* will be described.

The working chambers 84 in FIGS. 4*a* and 4*b* have respective effective areas with a non-binary relationship of 7:4:2:1. Although the four working chambers 84 have effective areas with a non-binary relationship, the second working chamber 84-B, the third working chamber 84-C and the fourth working chamber 84-D have a binary relationship of 4:2:1.

As can be seen in FIG. 4*b*, the force output 90 of the output member 46 is the same in pressurization states 8 and 9. According to one example, pressurization state 8 is prevented when the hydraulic actuator 40 adopts any of pressurization states 9-16. Thus, if a force output 90 corresponding to pressurization states 8 and 9 is requested when the first working chamber 84-A is connected to the high-pressure side 48, pressurization state 9 will be selected since pressurization state 8 is prevented. In this way, transition of the first working chamber 84-A from the high-pressure side 48 to the low-pressure side 50 is avoided. If a force output 90 close to the force output 90 of pressurization state 7 or lower is requested, the hydraulic actuator 40 transitions from any of pressurization states 9-16 to any of pressurization states 1-7 while skipping pressurization state 8.

According to the same example, pressurization state 9 is prevented when the hydraulic actuator 40 adopts any of pressurization states 1-8. Thus, if a force output 90 corresponding to pressurization states 8 and 9 is requested when the first working chamber 84-A is connected to the low-pressure side 50, pressurization state 8 will be selected since pressurization state 9 is prevented. In this way, transition of the first working chamber 84-A from the low-pressure side 50 to the high-pressure side 48 is avoided. If a force output 90 close to the force output 90 of pressurization state 10 or higher is requested, the hydraulic actuator 40 transitions from any of pressurization states 1-8 to any of pressurization states 10-16 while skipping pressurization state 9. Thus, pressurization state 8 is skipped during force decrease and pressurization state 9 is skipped during force increase. In this way, a hysteresis is introduced in the control of the hydraulic actuator 40, which reduces the number of switches of working chambers 84 between the high-pressure side 48 and the low-pressure side 50 and improves energy efficiency.

Figure 5:
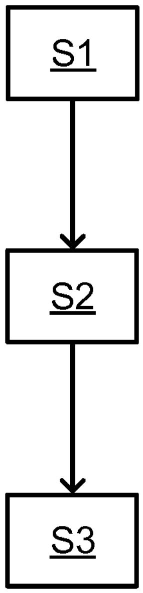
FIG. 5 is a flowchart outlining the general steps of the method according to the invention.

FIG. 5 is a flowchart outlining the general steps of the method according to the invention. The method comprises selectively fluidly connecting S1 each working chamber 84 to either a high-pressure side 48 or a low-pressure side 50 to provide a plurality of discrete pressurization states 92 of the hydraulic actuator 40; determining S2 at least one of the pressurization states 92 as a prevented pressurization state; and transitioning S3 between a plurality of allowed pressurization states among the pressurization states 92 while preventing transition to the at least one prevented pressurization state. Step S2 may be carried out before and/or after step S1.

It is to be understood that the present invention is not limited to the embodiments described above and illustrated in the drawings; rather, the skilled person will recognize that many changes and modifications may be made within the scope of the appended claims.

The invention claimed is:

1. A method of controlling a hydraulic actuator, wherein the hydraulic actuator comprises:

a linear double-acting output member, and at least three working chambers in fluid connection with the output member, the working chambers having respective effective areas with a non-binary relationship;

wherein the method comprises:

selectively fluidly connecting each working chamber to either a high-pressure side or a low-pressure side to provide a plurality of discrete pressurization states of the hydraulic actuator;

characterized in that the method further comprises determining at least one of the pressurization states as a prevented pressurization state; and transitioning between a plurality of allowed pressurization states among the pressurization states while preventing transition to the at least one prevented pressurization state.

2. The method according to claim 1, wherein the method is carried out in a hydraulic system comprising:

a high-pressure side, a low-pressure side, and a valve arrangement arranged to selectively fluidly connect each working chamber to either the high-pressure side or the low-pressure side to provide the plurality of discrete pressurization states of the hydraulic actuator.

3. The method according to claim 1, wherein at least two of the working chambers have respective effective areas with a substantially binary relationship.

4. The method according to claim 1, wherein the hydraulic actuator comprises at least four working chambers, and wherein the fourth smallest effective area is 2.75-3.75 times the second smallest effective area.

5. The method according to claim 1, wherein the hydraulic actuator comprises at least four working chambers, and wherein the fourth smallest effective area is 6-7.5 times the smallest effective area.

6. The method according to claim 1, wherein the pressurization states are put in order based on a respective force output of the output member in each pressurization state, and wherein the method further comprises switching less than all working chambers between the high-pressure side and the low-pressure side when transitioning from each allowed pressurization state to an immediately adjacent allowed pressurization state.

7. The method according to claim 1, wherein the pressurization states are put in order based on a respective force output of the output member in each pressurization state, and wherein the method further comprises transitioning between two of the allowed pressurization states by skipping one or more of the at least one prevented pressurization state.

8. The method according to claim 1, further comprising determining one or more of the at least one prevented pressurization state in dependence of a currently adopted pressurization state.

9. The method according to claim 1, wherein the pressurization states are put in order based on a respective force output of the output member in each pressurization state, and wherein for constant pressures in the high-pressure side and the low-pressure side, a difference between a force output of the output member in one of the allowed pressurization states and a force output of the output member in one of the prevented pressurization states, is smaller than a difference between force outputs of the output member in two immediately adjacent allowed pressurization states.

10. The method according to claim 1, wherein for constant pressures in the high-pressure side and the low-pressure side, a force output of the output member in one of the allowed pressurization states and a force output of the output member in one of the prevented pressurization states are substantially the same.

11. A hydraulic system comprising:

a hydraulic actuator having a linear double-acting output member, and at least three working chambers in connection with the output member, the working chamber have respective effective areas with a non-binary relationship;

a high-pressure side;

a low-pressure side;

a valve arrangement arranged to selectively fluidly connect each working chamber to either the high-pressure side or the low-pressure side to provide a plurality of discrete pressurization states of the hydraulic actuator; and a control system configured to control the hydraulic actuator by controlling the valve arrangement;

characterized in that the control system is configured to:

determine at least one of the pressurization states as a prevented pressurization state; and control the hydraulic actuator to transition between a plurality of allowed pressurization states among the pressurization states while preventing transitioning to the at least one prevented pressurization state.

12. The hydraulic system according to claim 11, wherein at least two of the working chambers have respective effective areas with a substantially binary relationship.

13. The hydraulic system according to claim 11, wherein the hydraulic actuator comprises at least four working chambers having respective effective areas with a non-binary relationship; and wherein two of the working chambers have respective effective areas with a substantially binary relationship.

14. The hydraulic system according to claim 11, wherein the hydraulic actuator comprises at least four working chambers, and wherein at least three of the working chambers have respective effective areas with a substantially binary relationship.

15. A working machine comprising a hydraulic system comprising:

a hydraulic actuator having a linear double-acting output member, and at least three working chambers in connection with the output member, the working chamber have respective effective areas with a non-binary relationship;

a high-pressure side;

a low-pressure side;

a valve arrangement arranged to selectively fluidly connect each working chamber to either the high-pressure side or the low-pressure side to provide a plurality of discrete pressurization states of the hydraulic actuator; and a control system configured to control the hydraulic actuator by controlling the valve arrangement;

characterized in that the control system is configured to:

determine at least one of the pressurization states as a prevented pressurization state; and control the hydraulic actuator to transition between a plurality of allowed pressurization states among the pressurization states while preventing transitioning to the at least one prevented pressurization state.

* * * * *